E. S. BEHRINGER.
Improvement in Coffee-Pots.
No. 129,882.  Patented July 30, 1872.
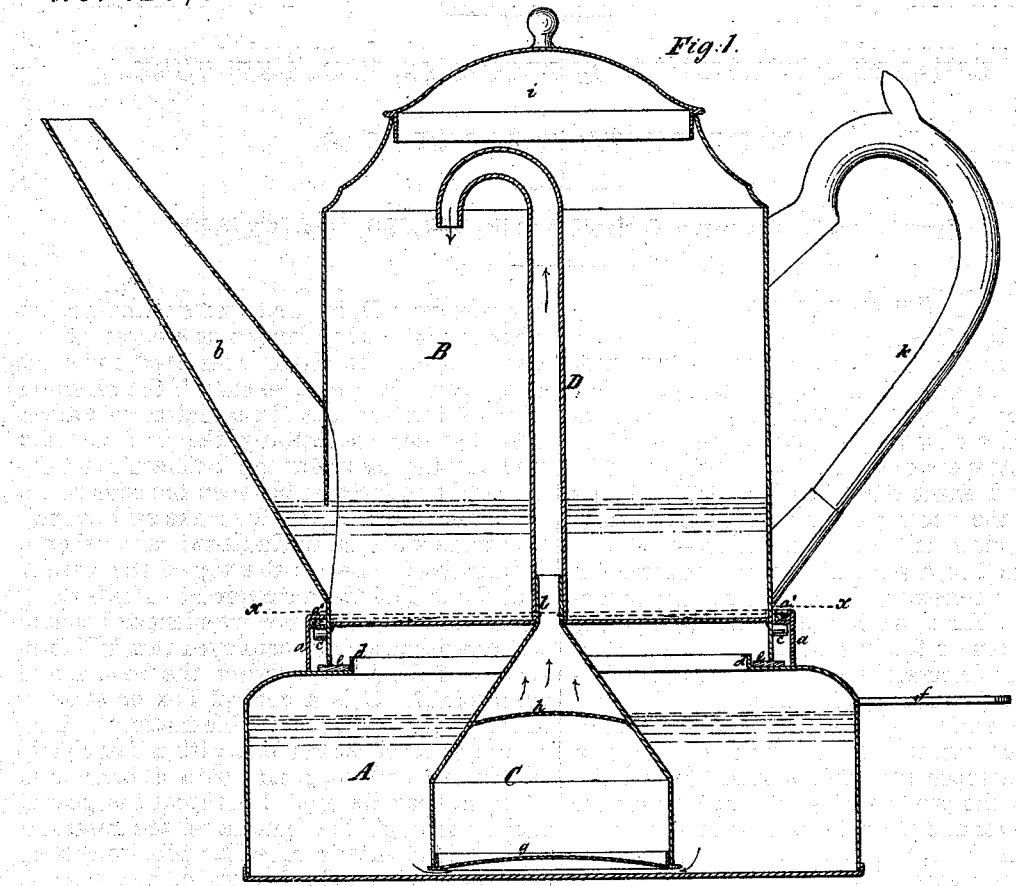
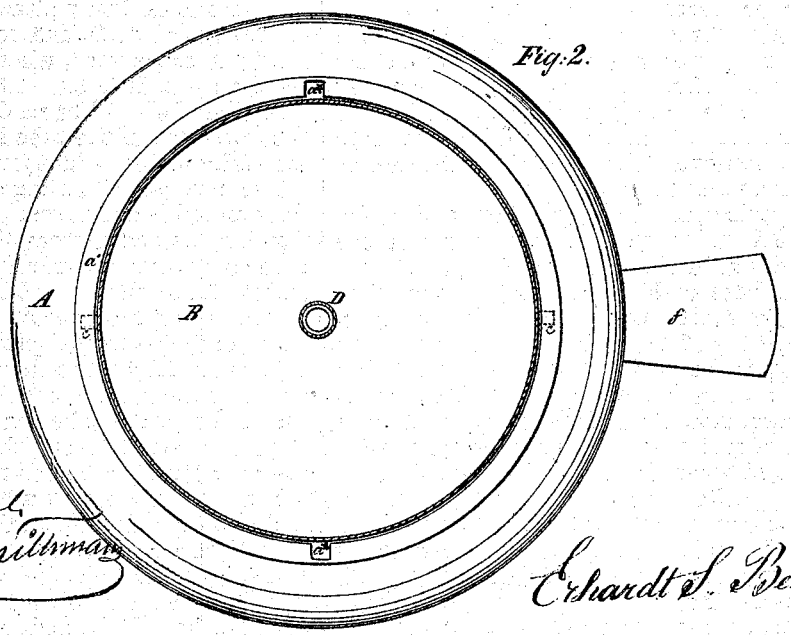
Witnesses:
Albert F. Schlegel
John Schmittman
Erhardt S. Behringer

UNITED STATES PATENT OFFICE.

ERHARDT S. BEHRINGER, OF BROOKLYN, E. D., NEW YORK.

IMPROVEMENT IN COFFEE-POTS.

Specification forming part of Letters Patent No. 129,882, dated July 30, 1872.

SPECIFICATION.

*To all whom it may concern:*

Be it known that I, ERHARDT S. BEHRINGER, of the city of Brooklyn, E. D., in the county of Kings and State of New York, have invented a new and useful Improvement in Coffee-Steepers, of which the following is a full, clear, and exact description, reference being had to the accompanying drawing forming part of this specification, in which—

Figure 1 is a vertical central section of a coffee-pot constructed according to my invention, and Fig. 2 is a horizontal section of the same taken on the line $x$ $x$.

Similar letters of reference indicate corresponding parts in both figures.

My invention relates to a coffee-steeper of a novel construction, the same consisting of a base or steeper proper designed to hold the coffee in the process of steeping; a reservoir placed over and upon the said steeper, detachable therefrom, but when in position closing the steeper steam-tight, designed to receive the coffee decoction from the steeper, the same being thrown from the steeper onto the reservoir by the pressure of steam in the steeper; a perforated coffee-strainer placed in the steeper to contain the coffee; and a pipe leading from the said coffee-strainer up into the said reservoir, through which the decoction passes into the reservoir.

To enable others to fully understand my invention, I will now proceed to describe the same with reference to the drawing.

A is a base or boiler, made of tin or other suitable material, and of any desirable capacity. The top of this base is formed with an opening, $d$, the edge of said opening being turned up, and is also provided with a circular upright rim, $a$, which is firmly attached to the top of said base. This rim is formed with a flange, $a'$, turned inward, and having notches $a^*$ $a^*$, opposite each other, cut into it. B is a reservoir or pot proper, which is also made of tin or other suitable material, and of a capacity in proportion to the size of the base A. This reservoir or pot proper is provided with a spout, $b$, cover $i$, and handle $k$, the same as common coffee-pots, but has its sides extended a proper distance below its bottom to enable it to be placed on the top of the base A within the circular rim $a$. Close to the bottom of the reservoir B, on its outer surface, projections or pins $c$ $c$ are formed or secured, which will pass through the notches $a^*$ $a^*$ under the flange $a'$ of the rim $a$, so that, if the reservoir is placed within the rim $a$ and turned a certain distance horizontally, the projections or pins $c$ $c$ will pass under the inclines $c'$ $c'$, whereby a tight connection between the reservoir B and base A is formed. To make said connection more effectual an India-rubber washer, $e$, is interposed between the top of the base A and the end of the reservoir B. The locking device here described is convenient and cheap; but any other may be employed that will form a steam-tight joint between the base A and reservoir B. C is a conical box or strainer made of tin or other suitable material. This box or strainer is provided with a detachable perforated bottom, $g$, and with a perforated plate, $h$, near its top. Its throat $l$ is passed tightly through the bottom of the reservoir and made to enter a tube, D, while its bottom $g$ comes close to the bottom of the base A. The tube D is firmly attached to the bottom of the reservoir B, and is extended upward nearly to the cover $i$, where it is bent downward a short distance. The neck of the coffee-holder C should be made to fit tightly into the lower end of the tube D, so as to form substantially a steam-tight joint.

The process of boiling coffee in a pot thus constructed is as follows: The reservoir B, being first detached from the base A, is filled with cold water to within a little above the outlet of the tube D. The ground coffee is placed within the conical box or strainer C, between the perforated plate $h$ and detachable bottom $g$. About two-thirds of the water contained in the reservoir is then poured into the base or boiler A. The conical box or strainer is then inserted within the tube D, and the reservoir tightly attached to the base A, when the whole is placed on a hot stove. As soon as the water contained in the base commences to boil the steam generated therein will force said water through the ground coffee contained in the conical box or strainer C, up through the tube D, and into the reservoir B, until all the water contained in the base is forced out, which will be easily noticed by gurgling sounds arising. The reservoir is then detached from its base, and its contents may be conveniently poured out. By this process all the aroma contained in the coffee is retained, and the desirable ingredients of the latter are thoroughly extracted in a very short time.

I am aware there is no novelty in the effecting of a circulation of the water within a boiler by causing the water as it becomes heated at the bottom to rise in or through a tube to the top. This is claimed to be done in the patent granted to E. F. Woodward March 25, 1862. In this the steam is permitted to rise into a reservoir placed on the steeper, while a circulation of the water merely is established within the steeper or boiler. No provision is made in that patent for confining the steam to create a pressure, whereby the water will be forced out of the steeper into the reservoir. I do not claim Woodward's devices or arrangements, intending to limit my claim to the construction and arrangement of the coffee-steeper described, whereby the pressure of the steam generated in the boiler forces the water out of the boiler through the coffee once for all into the reservoir above it, from which it is not permitted to return.

It is evident that this apparatus may be used to steep tea and make other decoctions.

What is here claimed, and desired to be secured by Letters Patent, is—

The combination of the steeper A and the reservoir B, the latter being made to close the former steam-tight, or substantially so, when connected with it, together with the strainer C, whereby the pressure of steam generated in the said steeper will force the water once for all through the said strainer up into the said reservoir, substantially as specified.

ERHARDT S. BEHRINGER.

Witnesses:
ALBERT F. SCHLEGEL,
JOHN SCHMITTMANN.